Figures 1, 2:
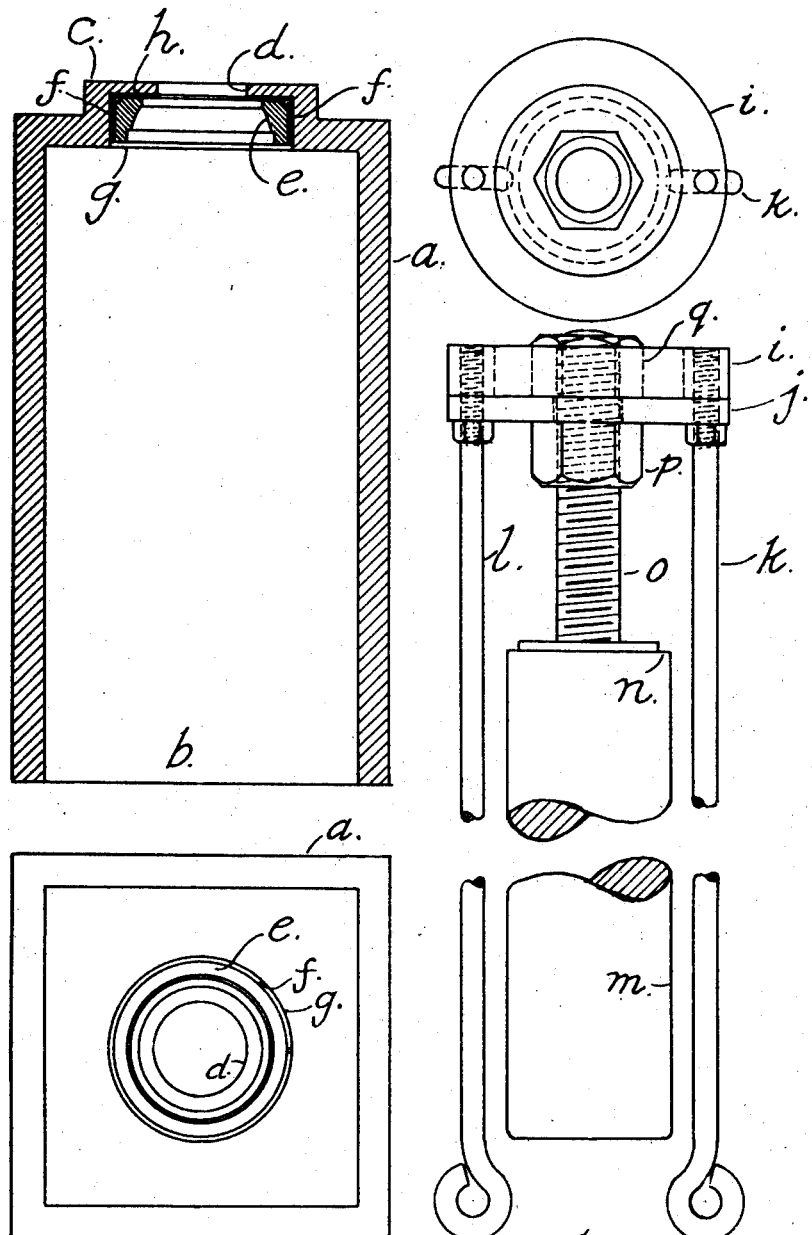

July 3, 1928.

A. C. LYEN ET AL 1,675,568

MEANS FOR INSERTING OR SEATING THE OUTER RACES OF BALL BEARINGS, BUSHINGS, AND THE LIKE IN MACHINE HOUSINGS

Filed Aug. 4, 1926  3 Sheets-Sheet 1

WITNESSES:   INVENTORS

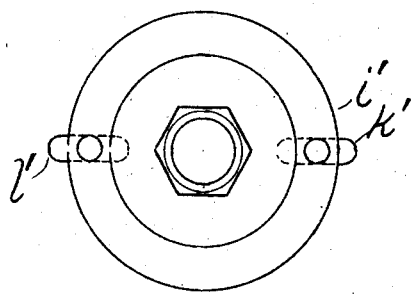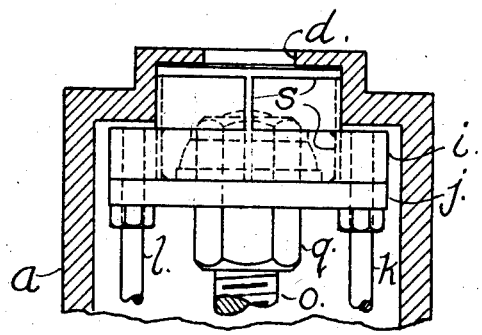
Fig. 4.
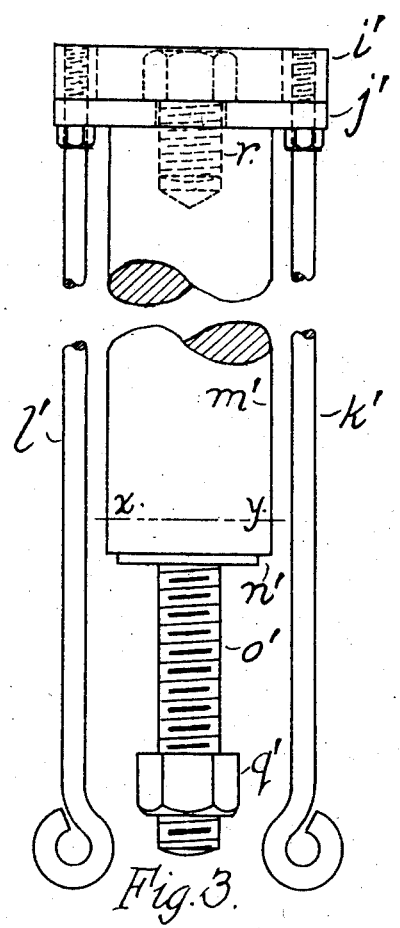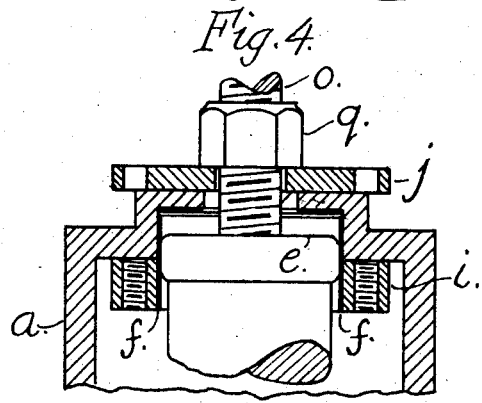
Fig. 5.
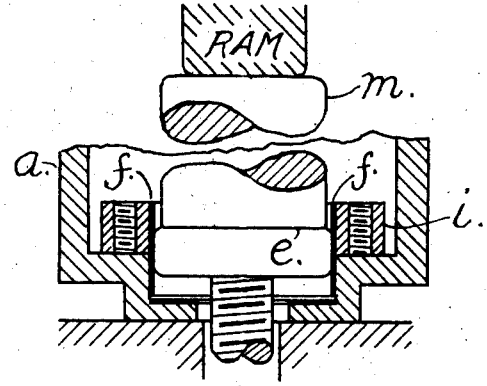
Fig. 6.
Fig. 3.

July 3, 1928.  1,675,568
A. C. LYEN ET AL
MEANS FOR INSERTING OR SEATING THE OUTER RACES OF BALL
BEARINGS, BUSHINGS, AND THE LIKE IN MACHINE HOUSINGS
Filed Aug. 4, 1926    3 Sheets-Sheet 3

WITNESSES    INVENTORS

Patented July 3, 1928.

1,675,568

UNITED STATES PATENT OFFICE.

ANDREW C. LYEN AND CHARLES W. MORGAN, OF CHICAGO, ILLINOIS.

MEANS FOR INSERTING OR SEATING THE OUTER RACES OF BALL BEARINGS, BUSHINGS, AND THE LIKE IN MACHINE HOUSINGS.

Application filed August 4, 1926. Serial No. 127,077.

Our invention relates to appliances used for seating the outer races of ball-bearings, or bushings in recesses provided for them in machine housings, and this invention is particularly applicable to magnetos wherein a thin and fragile lining to the recess, such as a strip of paper curved into the form of a cylindrical collar is used to separate the periphery of the outer race of the ball-bearing from the interior surface of the recess. It will become obvious to all whom may be versed in mechanic arts, that while we describe the construction and use of our invention particularly in relation to the seating of ball-bearing races in magneto housings, our invention is broadly applicable to the seating of bushings and other cylindrical bodies that are to be forced into recesses lined with thin and fragile material. We therefore wish it to be understood that we do not limit our invention to the particular application described.

The first object of our improvement is to devise a means of holding and supporting the thin and fragile paper lining to the ball-bearing recess in a magneto housing, in order to prevent any crumpling or buckling of the lining while forcing the outer race of the ball bearing to a seat.

The second object of our invention is to devise a means of seating a race or bushing in a position not easy to get at, such as in a magneto housing of deep construction wherein the recess for the race is accessible through the end of the housing most remote from the recess and from the inside only.

The third object of our invention is to devise unique combinations of our means of holding the paper lining, and means of operating it in remote positions, with means for applying force to the race to bring it to a final seat.

We attain the first object of our invention by devising a ring to support circumferentially in a manner hereafter described, the thin paper lining of the bearing recess previously mentioned, while the race of the ball-bearing is being forced to a seat.

We attain the second object of our invention by devising a positioning appliance which permits inserting and releasing the supporting ring for service in a remote position in a magneto housing.

The third object of our invention is attained by so designing the handle of the positioning appliance that it may be utilized as a pressure arbor or as a puller for carrying on the final operation of forcing the ball-bearing outer race to a firm seat.

In the drawings forming a part of this specification like characters of reference indicate corresponding parts in all views. The thickness of paper in the drawings has been greatly exaggerated and in those drawings wherein paper strips or washers are shown in cross-section, these cross-sections are indicated by heavy black lines.

Figures 7, 8, 9:
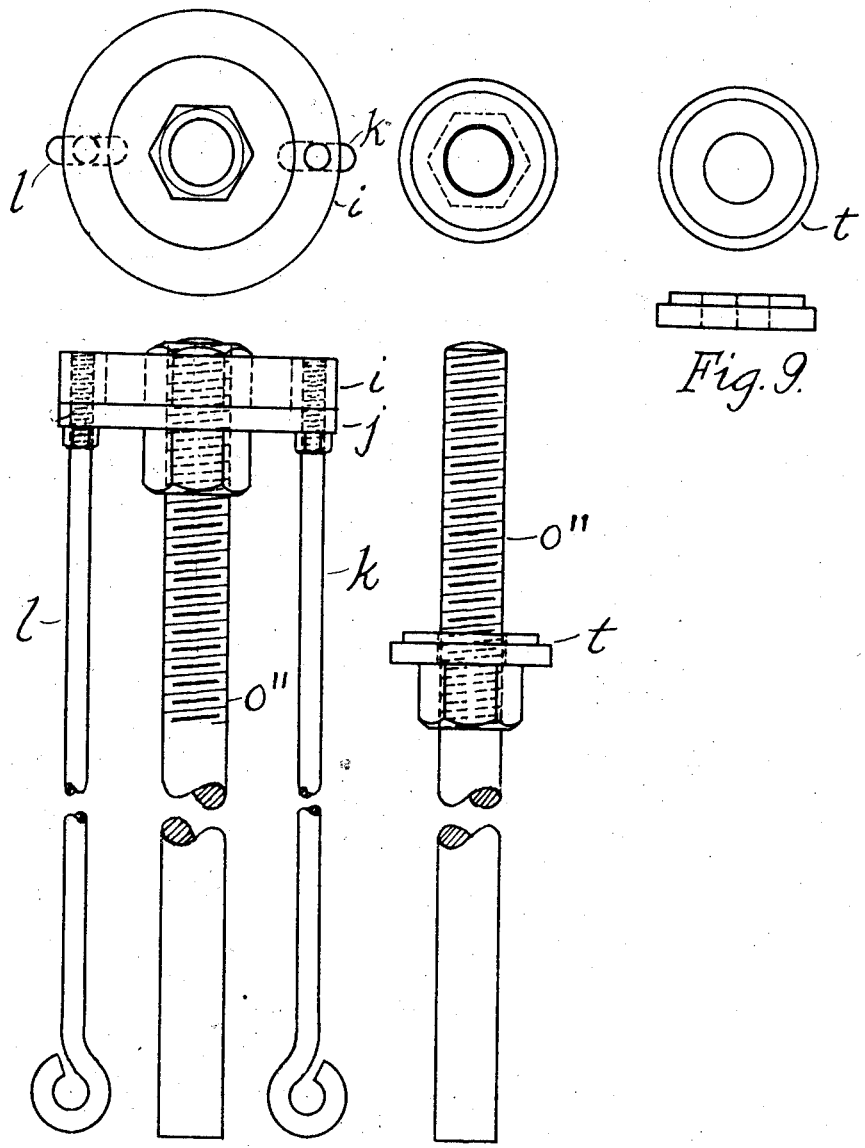

Fig. 1 shows diagrammatically, a magneto housing with an outer race of a ball-bearing seated in a paper-lined recess at the closed-over end; Fig. 2 shows one form of our invention; Fig. 3 shows a second form of our invention; Fig. 4 shows our invention being used to insert the paper lining for the bearing recess in a magneto housing; Fig. 5 shows elements of our appliance being used as a puller to draw the ball-bearing race to a final seat; Fig. 6 shows elements of our appliance being used as a pressure arbor instead of a puller in forcing the race to a seat; Fig. 7 shows a third form of our invention; Fig. 8 shows certain elements of the third form which may be utilized as arbor or puller; and Fig. 9 shows a washer used on the arbor in Fig. 8.

In order to obtain a perfectly clear understanding of our invention, it is necessary before describing its construction, to describe the process and mechanical difficulties met in carrying through the process of inserting a bearing race before we devised our appliance. In Fig. 1 we show diagrammatically, a cross-section through a long housing such as may be found on several makes of magnetos. At $a$ is shown the housing, open at the end $b$ and closed over at the end $c$ except for the armature shaft hole $d$. A ball-bearing outer race is shown at $e$. The race is supposedly a tight fit within the paper strip $f$ encircling it, which in turn is tightly fitted in the bearing recess $g$. The race $e$ also fits snugly against the paper washer $h$. Therefore the race is electrically insulated from the interior of the recess, and is firmly fixed in position. Heretofore it has been customary to first place the paper washer $h$ in position in the housing recess $g$ and then curl up a piece of paper in the form of a cylindrical collar and set it in place in the recess with a long pair of pliers. It has been common to cut the paper strip wider than necessary so that when curled up and set in place, a part of it would project inwardly in the magneto housing and because of this projection, the tendency of the paper to crumple or buckle would be lessened when the ball-bearing race was being pushed in to a seat. To force the race into the paper-lined recess, an arbor has been used to the end of which the bearing race would be attached with vaseline or similar gummy substance, and then carefully shoved into the paper-lined recess. The difficulty however, was as inferred. The paper would slip out of alignment and then crumple so that the operation would have to be repeated again with a new strip of paper and so on until successful.

We are now prepared to describe our invention. One of the principal and most essential elements of our invention is the ring $i$ shown in Fig. 2. This ring $i$ is made sufficiently small in exterior diameter to permit its passing within the interior of the magneto housing $a$ shown in Fig. 1. The interior diameter of the ring $i$ is made slightly larger than the interior diameter of the recess $g$ in the magneto housing $a$. The width of the ring $i$ should not be less than the width of the bearing race $e$ for practical reasons which will be clearly understood further on. $j$ is a washer fitting tight against ring $i$. Through holes in $j$, pass the long slender screw rods $k$ and $l$, each of which is threaded, provided with a nut and screwed into tapped holes in ring $i$. It is obvious that the rods $k$ and $l$ may be unscrewed from $j$ thus releasing ring $i$. It will be apparent to many mechanics that there are numerous well-known contrivances by which the ring $i$ may be readily attached and detached from washer $j$, of which the pair of screw rods $k$ and $l$ are but a single illustration. The member $m$—$n$—$o$ of Fig. 2 has a shoulder $n$ and a reduced portion $o$ provided with a thread. The diameter of $o$ is less than the diameter of the armature shaft hole in a magneto housing. The washer $j$ is held in position on $o$ by being locked between nuts $p$ and $q$.

A second form of our invention embracing identical essential elements as that shown in Fig. 2, is shown in Fig. 3. It will be observed that in this form the washer $j'$ corresponding to $j$ in Fig. 2, is shown permanently attached to the large end $m'$ of the member $m'$—$n'$—$o'$ by a cap screw $r$. It will be observed in Fig. 3, that if the device be cut in two at line $x$—$y$, the two portions thus formed consist of the paper supporting ring $i'$ and placing elements $m'$, $j'$, $k'$, $l'$, and race puller elements $n'$, $o'$ and $q'$. We mention this division of this form of our appliance into separate parts as it may be found more economical to manufacture two or more of the elements comprising our invention as separate units, which will be used in succession in performing the service for which each is designed.

The third form of our invention illustrated in Fig. 7, is but a variation of that shown in Fig. 2, which would be an obvious development to anyone skilled in the art had they seen the form shown in Fig. 2. In this form in Fig. 7, the central screw rod $o''$ is of uniform length throughout. The mechanical effect of the shoulder $n$ of Fig. 2, is attained in Fig. 8, by using the washer $t$ backed up by a nut screwed back to the extremity of the thread.

The use of our appliance is as follows: The paper strip to be used as a lining to the recess in the magneto housing, is first cut to such a size that when rolled about the circumference of the bearing race, the two ends of the strip will nearly touch, as indicated along the center line in Fig. 4, where the strip is shown at $s$. The width of the paper strip is made slightly less than the sum of the width of the race $e$ plus the width of the ring $i$.

Having any one of the three forms of our appliance completely assembled as illustrated in Fig 2, Fig. 3, or Fig. 7 the mechanic curls up the paper strip and places it in the cup formed by ring $i$ and washer $j$. As the interior dimension of the ring is slightly in excess of that of the bearing recess in the magneto housing, the mechanic has no difficulty now in pressing the ball-bearing race $e$ down in the curled-up paper collar. The mechanic now places washer $h$ in the recess $g$. He then grasps the end of our appliance opposite the cup and using this end as a handle he passes the cup containing the paper and race inside the magneto housing and presents it to the recess for the race. Now by watching through the shaft hole $d$, he can by a little careful manipulation, guide the paper collar projecting from the cup, into the bearing recess. In Fig. 4 the paper is shown almost in position.

Now the mechanic unscrews the rods $k$ and $l$ and removes these together with the handle portion of the appliance and the washer $j$ thereto attached, thus leaving the paper lining in place in the recess, the race ready for entry into its final position and the supporting ring $i$ surrounding the part of the paper lining projecting inwardly from the recess. It is optional whether the mechanic choose to pull the race to a snug seat in the recess or whether he press it to a seat. In Fig. 5, the race is shown as pulled half way to its final position, while in Fig. 6, the race is shown in a similar position but having been pushed to this position by using elements of our appliance as an arbor used in conjunction with a press of some sort. Such mechanical operations are so well known that further detailed description is unnecessary. Having seated the race, the ring $i$ is shaken out and the excess paper torn away and removed.

In practice it will be found desirable to furnish a complete set of elements to fit different sizes of ball-bearing races. To do so, we provide auxiliary washers such as $t$ shown in Fig. 9, which may be slipped on to the central rod of any of the three forms shown, thereby changing the effective diameter of the particular element used to press against the race and force it to a seat.

In relation to the effectiveness of our invention, we find that the paper will not crumple or buckle while the ball-bearing race is being forced to a seat. This is due to the facts that the bearing race is held in almost perfect alignment when starting its entry into the recess. Furthermore, there is a stiffening action on the paper lining being rigidly supported by that part extending into the holding ring. In addition, as the race starts to move into position, it begins to press tightly outward in all directions against the paper lining thus locking it from slipping. As the race advances further, it is still being held in alignment by the supporting ring.

From the foregoing, it will be obvious that the essence of our invention lies in providing a circumferential mechanical support to the paper collar so that this collar in entirety is substantially prevented from accidental distortion from cylindrical form during the seating operation. Hence we claim this principle broadly in one of our claims which follow.

We claim,—

1. Means of seating the outer race of a ball-bearing in the recess provided therefor in a magneto housing wherein the recess is lined with a strip of paper or other thin material curled into the form of a wide cylindrical collar, comprising the combination of a ring with a puller, the ring having a cylindrical interior of approximately the same diameter as that of the housing recess and a width approximately equal to that of the outer race, the wide cylindrical collar being of sufficient size to line both the recess and the ring when the ring is placed in a framing position against the border of the recess preparatory to the seating of the race, the puller being devised to apply power to the periphery of the outer race of the ball-bearing and slide it axially along the interior of the wide cylindrical collar from an initial preparatory position in the ring to a final seated position within the housing recess; the particular purpose of the ring being to prevent slipping of the lining paper of which the wide cylindrical collar is composed by affording to it a substantial circumferential support during the seating operation.

2. Means of seating the outer race of a ball-bearing in the recess provided therefor in a magneto housing wherein said recess is lined with a strip of paper or other thin material curled into the form of a wide cylindrical collar, comprising the combination of a ring with an arbor and a press, the ring having a cylindrical interior of approximately the same diameter as that of the housing recess and a width approximately equal to that of the outer race, the wide cylindrical collar being of sufficient size to line both the recess and the ring when the ring is placed in a framing position against the border of the recess preparatory to the seating of the race, the arbor and press being arranged to apply power to the periphery of the outer race of the ball-bearing and slide it axially along the interior of the wide cylindrical collar from an initial preparatory position in the ring to a final seated position within the housing recess; the particular purpose of the ring being to prevent slipping of the lining paper of which the wide cylindrical collar is composed by affording to it a substantial circumferential support during the seating operation.

3. Means of seating from a remote position the outer race of a ball-bearing in the recess provided therefor in a magneto housing wherein said recess is lined with a strip of paper or other thin material curled into the form of a wide cylindrical collar, comprising the combination of a ring with a handle and a puller, the ring having a cylindrical interior of approximately the same diameter as that of the housing recess and a width approximately equal to that of the outer race, the wide cylindrical collar being of sufficient size to line both the recess and the ring when the ring is placed in a framing position against the border of the recess preparatory to the seating of the race, the handle being devised for attachment to and detachment from the ring for the purpose of placing the ring in the preparatory position, the puller being devised to apply power to the periphery of the outer race of the ball-bearing and slide it axially along the interior of the wide cylindrical collar from an initial preparatory position in the ring to a final seated position within the housing recess; the particular purpose of the ring being to prevent slipping of the lining paper of which the wide cylindrical collar is composed by affording to it a substantial circumferential support during the seating operation.

4. Means of seating from a remote position the outer race of a ball-bearing in the recess provided therefor in a magneto housing wherein said recess is lined with a strip of paper or other thin material curled into the form of a wide cylindrical collar, comprising the combination of a ring with a handle and an arbor and a press; the ring having a cylindrical interior of approximately the same diameter as that of the housing recess and a width approximately equal to that of the outer race, the wide cylindrical collar being of sufficient size to line both the recess and the ring when the ring is placed in a framing position against the border of the recess preparatory to the seating of the race, the handle being devised for attachment to and detachment from the ring for the purpose of placing the ring in the preparatory position, the arbor and press being arranged to apply power to the periphery of the outer race of the ball-bearing and slide it axially along the interior of the wide cylindrical collar from an initial preparatory position in the ring to a final seated position within the housing recess; the particular purpose of the ring being to prevent slipping of the lining paper of which the wide cylindrical collar is composed by affording to it a substantial circumferential support during the seating operation.

5. A detachable handle for use in combination with the ring specified in claim 3, and for the purpose therein set forth, comprising a long heavy rod provided with a long threaded portion at one end and provided with nuts mounted thereon, a large washer mounted on and perpendicular to the rod and locked between and by the nuts thereon, a plurality of long slender rods each provided with a thread at one end and a small stop-nut thereon, the said rods being devised to temporarily attach the large washer to the ring specified in claim 13, by passing the threaded ends of the slender rods through small holes provided at intervals near the periphery of the large washer and screwing them into small tapped holes provided for them in the side of the ring.

6. A puller for use in combination with the ring specified in claim 3, and for the purpose therein set forth, comprising a long heavy rod provided with a long threaded portion at one end and provided with nuts thereon, a large washer mounted on and perpendicular to the rod and between the nuts thereon, and a pressure washer of slightly less diameter than the outside diameter of the ball-bearing outer race being seated, also mounted on the rod and between the nuts thereon, the pressure washer being used to apply power to the outer race and move it to its seated position, and one of the nuts and long threaded portion being used to put tension in the rod required for moving the race to its seated position in the manner set forth.

7. Means of seating a bushing in the recess provided therefor in a machine housing or frame wherein the recess is lined with a wide collar of thin and fragile material, comprising the combination of a ring with a forcing appliance, the ring having an interior of approximately the same form and dimensions as the recess in the frame, the wide collar of lining material having a size sufficient to form a lining to both the recess and the ring when the ring is placed in a framing position against the border of the recess preparatory to the seating of the bushing, the arrangement and purpose of the forcing appliance being to apply power to the bushing and move it axially along the interior of the wide collar from an initial preparatory position in the ring to the final seated position in the frame recess; the purpose of the ring being to prevent slipping or crumpling of the fragile material of which the wide collar is composed by affording to it a substantial circumferential support during the seating operation.

8. Means of seating the outer race of a ball-bearing in the recess provided therefor in a magneto housing wherein the recess is lined with a strip of paper or other thin material curled into the form of a wide cylindrical collar, comprising the combination of a circumferential supporting member with a forcing appliance, the circumferential supporting member having a cylindrical interior of a diameter approximately equal to that of the housing recess, the wide cylindrical collar being of sufficient size to form a lining to the housing recess and extend as a lining also to the interior of the circumferential supporting member when this member is placed in a framing position against the border of the recess preparatory to the seating of the race, the arrangement and purpose of the forcing appliance being to apply power to the periphery of the outer race of the ball-bearing and move it axially along the interior of the wide collar from an initial preparatory position in the circumferential supporting member to the final seated position in the housing recess; the purpose of the circumferential supporting member being to prevent slipping or crumpling of the material of which the wide collar is composed by affording centripetal pressure against it during the seating operation.

Signed at 112 East 16th Street, Chicago, Ill., July 27, 1926.

ANDREW C. LYEN.
CHARLES W. MORGAN.